United States Patent [19]
Ferris

[11] 4,212,440
[45] Jul. 15, 1980

[54] CAMOUFLAGED AND DECEPTIVE DISTORTED VEHICLE AND METHOD OF ASSEMBLING SUCH VEHICLES

[76] Inventor: Carlisle K. Ferris, 50 Moraine Rd., Morris Plains, N.J. 07950

[21] Appl. No.: 901,799

[22] Filed: May 1, 1978

[51] Int. Cl.² .............................................. B64D 7/00
[52] U.S. Cl. .................................. 244/1 R; 427/280; 428/919
[58] Field of Search .............. 89/36 R, 36 Z; 114/15; 224/1 R; 427/262, 267, 274, 280; 428/195, 919

[56] References Cited

U.S. PATENT DOCUMENTS

| | | | |
|---|---|---|---|
| 715,013 | 12/1902 | Brush et al. | 114/15 |
| 1,296,753 | 3/1919 | Brush | 428/919 |

*Primary Examiner*—Stephen C. Bentley
*Attorney, Agent, or Firm*—Shlesinger, Arkwright, Garvey & Dinsmore

[57] ABSTRACT

A camouflaged and deceptive distorted vehicle comprising a top and bottom surface, the surfaces having pairs of coordinate sections including a fore and aft coordinate sections pair and a second left and right coordinate sections pair, at least one of the two pairs of coordinate sections of the top surface being colored, and the color on at least one of the two pairs of coordinate sections of the top surface graduating from dark to light beginning dark on one section and ending light on the other section, and including the method of assembling such vehicles.

70 Claims, 17 Drawing Figures

CAMOUFLAGED AND DECEPTIVE DISTORTED VEHICLE AND METHOD OF ASSEMBLING SUCH VEHICLES

THE FIELD OF THE INVENTION

This invention relates to aircraft, surface vessels or vehicles or the like having camouflage or deceptive coatings thereon for the purpose of hiding, or confusing the observer and includes also the method of assembling a group of aircraft for hiding or confusion purposes. The present invention relates in general to my application Ser. No. 668,983 filed Mar. 22, 1976, now U.S. Pat. No. 4,089,491 entitled A CAMOUFLAGED AIRCRAFT, SURFACE VESSEL OR VEHICLE OR THE LIKE.

HISTORICAL BACKGROUND

The use of camouflage for military vehicles, such as aircraft, ships, rockets, tanks, trucks and the like is well known. World War I aircraft, surface vessels including ships and tanks used various camouflage techniques. In later wars, the techniques were developed with various paint schemes to dazzle or confuse the eyes. Mackay U.S. Pat. No. 1,305,296 was an early patent showing a technique for rendering objects less visible by using multi-colors in splotch fashion. Brush et al 715,013 was an even earlier development using three basic colors in which the darkest color was placed on the top of the vessel with subsequent use of lighter colors on the lower surfaces of the vessel. The idea in general was to kill the contrast of light and shade.

More recently, Barclay U.S. Pat. Nos. 2,190,691 and Robson 2,292,848 show various techniques for camouflaging vessels including aircraft for the purpose of confusing the enemy so as to make it difficult for him to determine actual size and shape of a moving body.

There are many other publications in the area of camouflage including the U.S. Naval Institute Proceedings Publication of July, 1971 which provide photographs of various surface ships and varying camouflage techniques most of which provide "dazzle" effects.

When an object is viewed against the sky, things grow smaller in size with distance and they also grow progressively lighter in value and less distinct or more grey in color. The effect of sun or other light sources on surfaces cause problems with reflected light and shadow as they form over the object.

OBJECTS AND SUMMARY

It is an object of this invention to provide a camouflage scheme which will delay visual acquisition by the enemy.

It is another object of this invention to provide a camouflage scheme which will make continued visual contact difficult once acquired.

Yet a further object of this invention is to provide a camouflage scheme which will disguise aircraft, ships, or other types of vessels as to their type and identity.

Another object of this invention is to provide a camouflage scheme which will impair the estimation of range and speed.

Still a further object of this invention is to provide a camouflage scheme which will disguise the attitude, the angle, and the actual direction of the aircraft, surface vessel or vehicle or the like.

A further object of this invention is to provide a camouflage scheme which will delay recognition of the actions of the object by disruption of visual clues.

A still further object of this invention is to provide a camouflage scheme which will prompt indecision and induce mistakes on the part of the opponent.

Still yet another object of this invention is to provide a camouflage scheme which is secondarily directed towards concealment but primarily towards confusion.

Yet another object of this invention is to provide a camouflage scheme which will eliminate true lines of demarcation.

Another object of this invention is to provide a camouflage scheme which uses a minimum of three Munsell Color Values for contrast from dark to light.

Still a further object of this invention is to provide a camouflage scheme which uses basically flat coatings including such coatings as dark, medium and light grey.

Another object of this invention is to provide a camouflage scheme which provides a false cockpit-canopy on the underside of the aircraft in direct line position of the real cockpit-canopy so as to simulate the real cockpit-canopy.

Yet a further object of this invention is to provide coatings which are contrasted not only visually, but also by their anti-infrared character which are difficult to view with special electronic equipment and which will tend to confuse or otherwise break up reflected rays picked up by such equipment and translated thereby.

A further object of this invention is to provide a camouflage scheme which avoids the weakness of present "plug-type" camouflage schemes thereby to disrupt the outline of the object.

Still a further object of this invention is to provide a graduated color scheme for top and bottom surfaces of an aircraft which provides for either blending or striping in order to permit gradual change of the color contrast between Munsell Color Values.

A further object of this invention is to provide a camouflaged scheme in which the color variation changes with angularity on the top surface as well as the bottom surface of the aircraft relative to the longitudinal axis of the aircraft.

Yet another object of this invention is to provide a method for camouflaging aircraft by means of positioning the aircraft within certain marks on the ground which establish parallel or grid lines so that the aircraft can be easily painted in color graduating from dark to light by blending or striping.

Another object of this invention is to provide a method for camouflaging a group or plurality of aircraft so that individual aircraft of any group or plurality though having the same applied paint scheme will have the scheme reversed in order to lend confusion should one or another of the aircraft in the group or plurality roll through 180°.

Yet another object of this invention is to provide a camouflaged scheme for a group of aircraft which produces confusion to the observer so that he cannot determine which aircraft of the group are turning toward him and which aircraft of the group are turning away from him since the bottom surfaces of the aircraft are painted in a manner similar to the upper surfaces and in reverse order to further add confusion on observation when one aircraft or another of a group or plurality rolls through 180° or more.

Another object of this invention is to provide a method for marking aircraft on the ground which permits a series of similar model aircraft to be moved into position for marking with a minimum of difficulty so that each aircraft of the series can be quickly and easily painted identical to the other aircraft of the series or in the reverse of the aircraft of the series without changing any ground markings.

A still further object of this invention is to provide a method for marking aircraft on the ground which permits ease in alignment and swinging of the aircraft prior to camouflaged painting operation.

Another object of this invention is to provide a camouflaged paint scheme which is an improvement over "symmetrical" scheme.

In summary, therefore, this invention is directed to a camouflage scheme which can be readily adapted to all types of surface and air vehicles and which has, as its main object the confusion of the enemy.

In the accompanying drawings which illustrate by way of example various embodiments of this invention:

Figure 2:
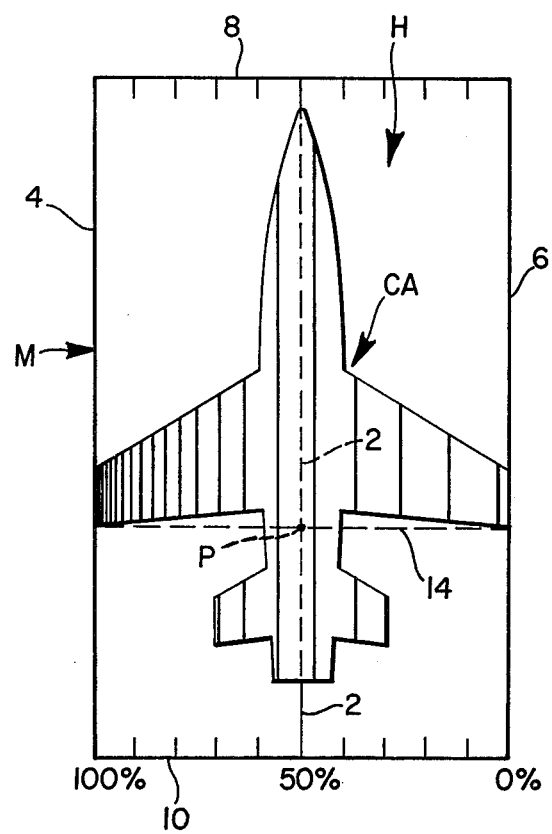
FIGS. 2 through 4 are plan views of hardstands with a conventional swept-wing aircraft positioned thereon and painted in blended fashion with the aircraft positioned at varying degrees to show the typical painting designs as applied to the aircraft at angles of 0°, 22½° and 45°.
Figure 3:
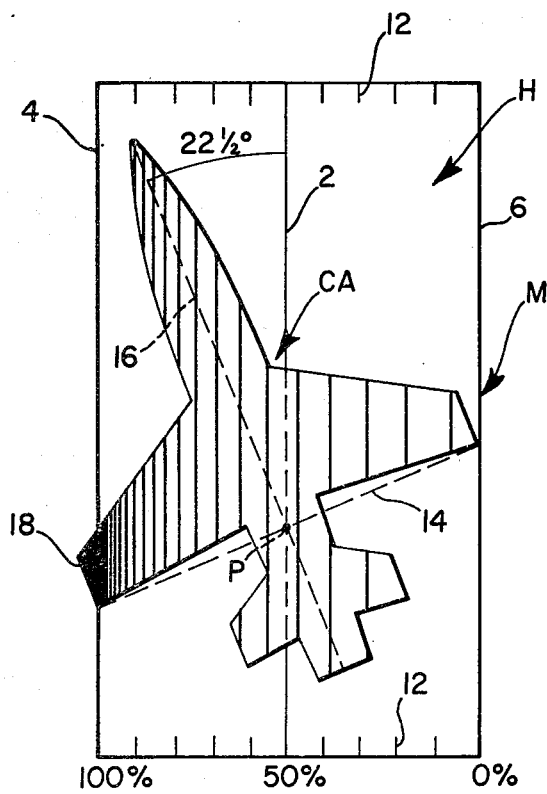
Figure 4:
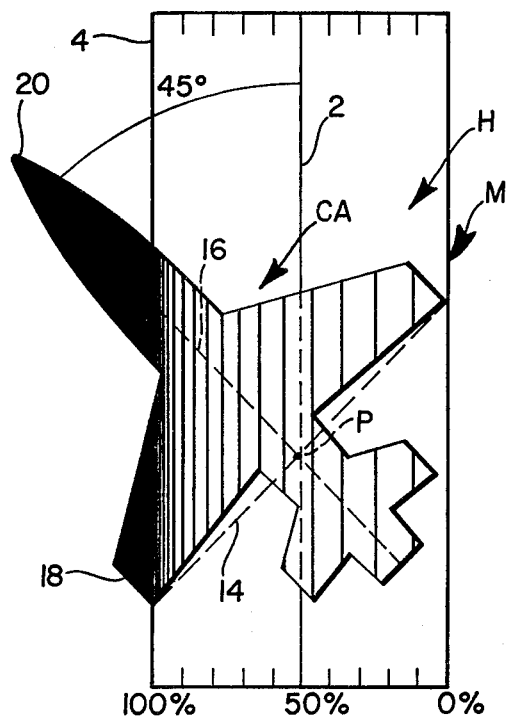

FIGS. 5 through 8 are plan views of hardstands with a delta-wing aircraft positioned thereon and painted in blended fashion and the aircraft positioned at varying degrees to show the typical painting designs as applied to the aircraft at angles of 0°, 11¼°, 22½° and 45° in the reverse order of those shown in FIGS. 2 through 4.

Figure 9:
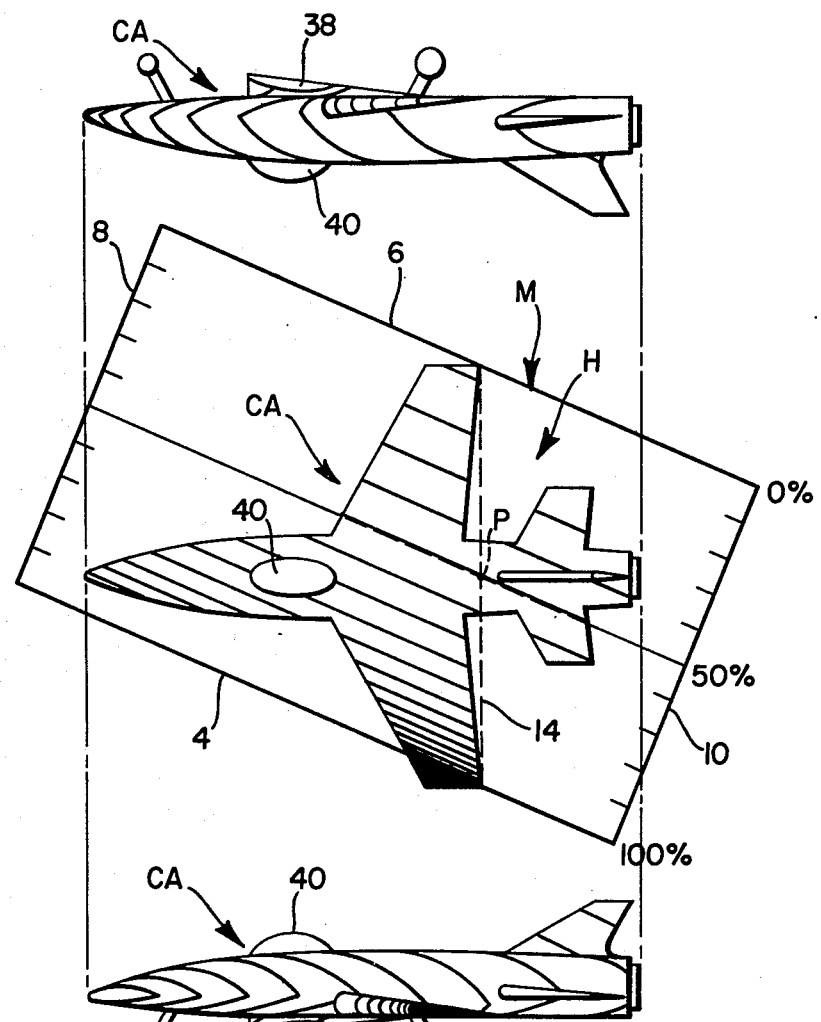

FIG. 9 is a plan view of a hardstand with a conventional swept-wing aircraft positioned angularly thereon and shown in layout with the right side elevation, top plan and left side elevation views of the aircraft and showing a typical blending paint scheme thereon.

Figure 10:
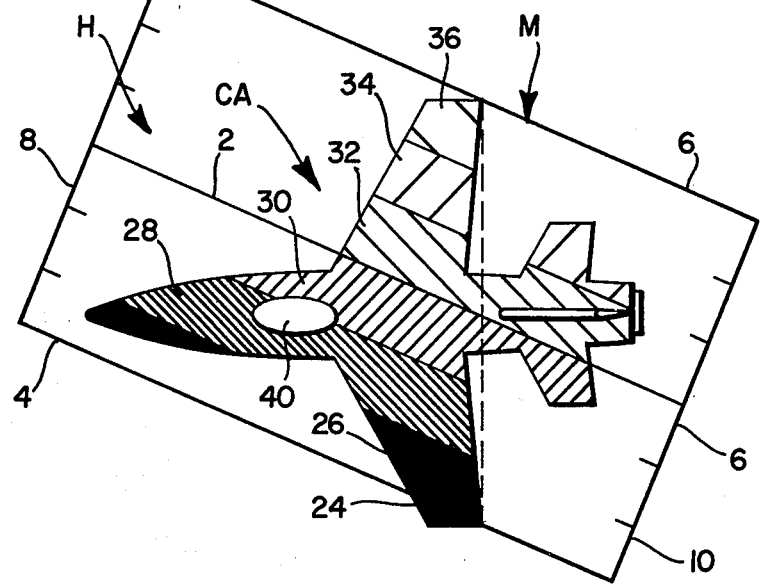

FIG. 10 is a plan view of a hardstand with a conventional swept-wing aircraft angularly positioned thereon and painted in striped fashion.

Figure 11:
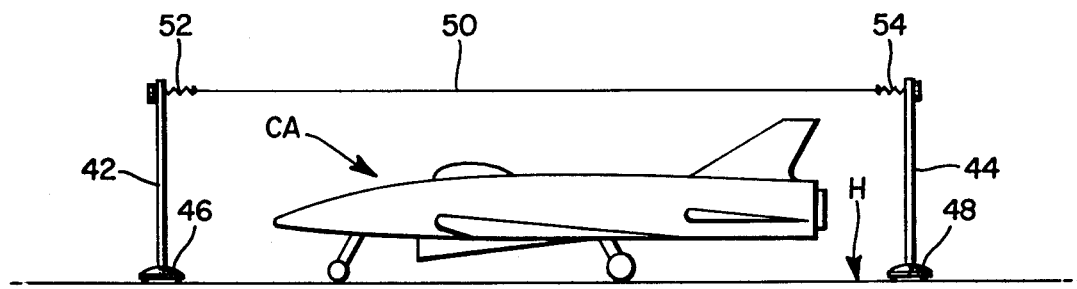

FIG. 11 is a side elevation of a hardstand with an aircraft positioned thereon for use in marking or otherwise assisting in the painting of the camouflage scheme on the aircraft.

Figure 12:
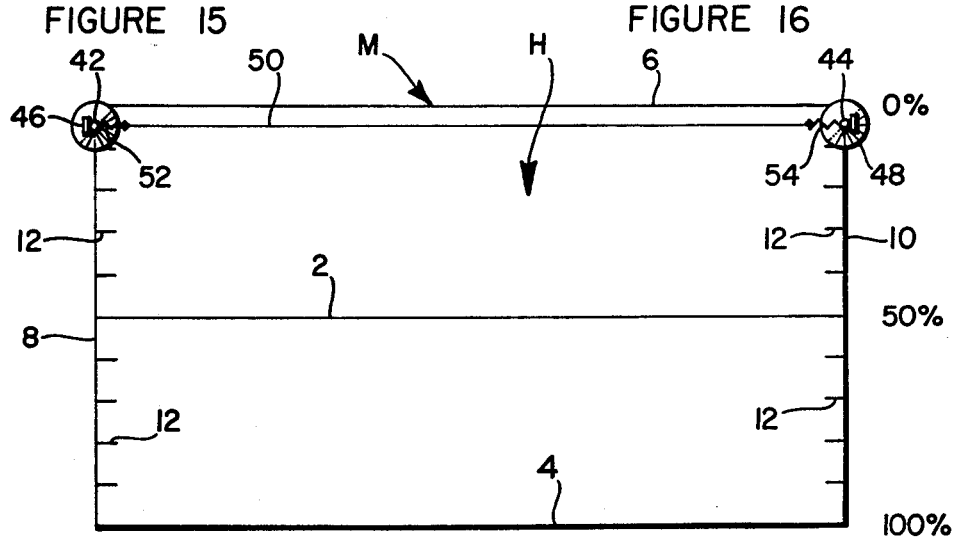

FIG. 12 is a top plan view of a hardstand with the marking apparatus shown positioned to one side prior to positioning of an aircraft thereon.

FIGS. 13, 14, 15 and 16 are fragmentary side elevational views of the rear portion of a aircraft showing the vertical stabilizer with different paint schemes painted thereon.

Figure 17:
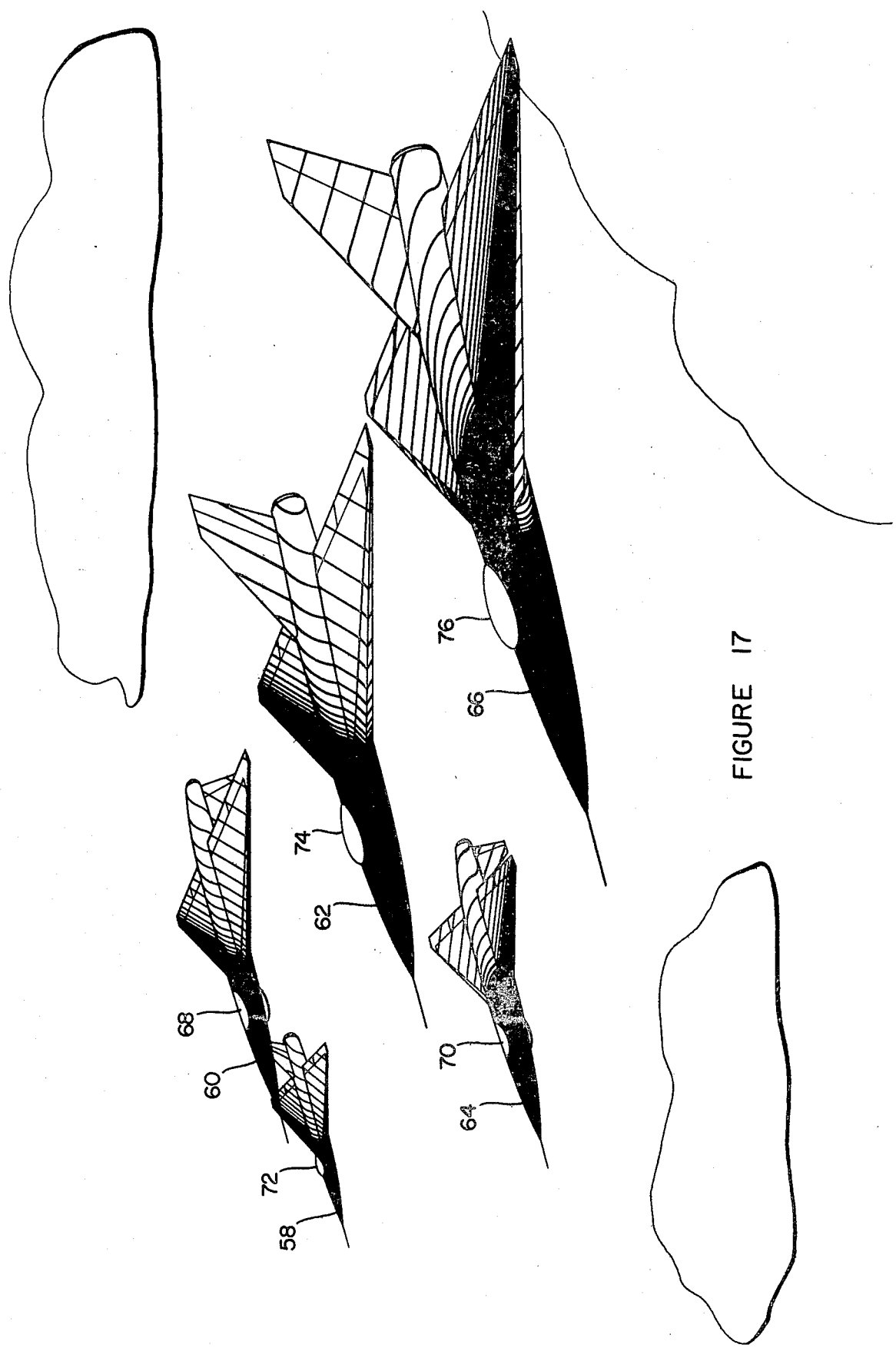

FIG. 17 is a perspective view of a plurality of aircraft in assembled relation headed in the same direction with some of the aircraft being in upright and some of the aircraft being in inverted position for the purpose of deception with various camouflage schemes of this invention applied thereto.

FIGS. 1 THROUGH 4

Figure 1:
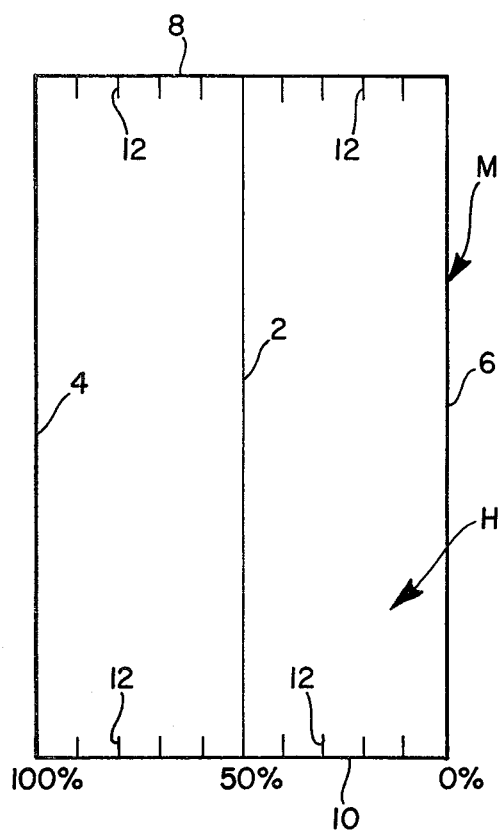
FIG. 1 is a top plan view of a hardstand for parking and painting aircraft.

FIG. 1 shows a hardstand H. The hardstand is outlined with a painting matrix M. The painting matrix M comprises a center line 2 and border parallel lines 4 and 6. The matrix is framed in by end lines 8 and 10. Center line 2 is designated as 50% and border parallel lines 4 and 6 as 100% and 0% respectively. Intermediate markers 12 are provided between lines 2, 4 and 6 and preferably are indicated adjacent both end lines 8 and 10. The painting matrix M may be painted directly on the hardstand H or may be outlined in tape. The matrix may be a sheet of material with the various lines imprinted thereon and rolled out onto the hardstand and secured or otherwise positioned thereon. Intermediate markers 12 may be paint or tape or some other marking means. As will be noted in FIG. 1, the percentages are indicated adjacent line 10 with 100% being line 4, 50% line 2, and 0° line 6. In FIG. 2 the conventional aircraft CA is positioned on the hardstand H so that its longitudinal axis is positioned directly on the center line 2. The width of the painting matrix M is substantially the same as the distance between the trailing edges of the wing as shown in the dashed line 14. The pivot point P is designated where the center line 2 crosses the dashed line 14. In FIG. 2 it will be noted that the paint scheme is applied with the darkest paint being at 100% and the lightest at 0° with the paint graduating from dark to light as viewed from left to right in FIG. 2.

There is a standard method of specifying color which is known as the Munsell System. This system has been standardized by the American Society for Testing and Materials of Philadelphia, Pa. 19103 and is listed in the book ASTM Standards, copyrighted in 1969. Under the Munsell Standard System, colors include black and white and grays as well as hues such as red, yellow, green, blue and purple. A Munsell value is the daylight reflectance of a specimen expressed on a scale extending from 0 for ideal black to 10 for ideal white by steps of approximately equal visual importance. For the purposes of this invention, it has been found that the degree of value necessary for camouflaging must not be less than about 3 Munsell values in order to have sufficient contrast. For deception, it is preferred that the dark color be applied to the nose of the aircraft in order to reduce visual perception of the aircraft by highlighting. It is further more desirable that the aircraft be painted diagonally dark to light from one wing tip to the other rather than parallel to the longitudinal axis although for some purposes this may be satisfactory as illustrated in FIG. 2. The blending scheme of the paint as applied to the aircraft CA of FIG. 2 is illustrated with the darkest area being on the left wing tip and the lightest area being the right wing tip. The center line 2 bisects the aircraft as shown with the darkest portion of the aircraft being to the left and the lightest portion being to the right of the top surface of the aircraft as shown. In FIG. 2, the center line of the matrix M and the aircraft CA are identical. It is possible to use different colors so long as the Munsell value changes from one wing tip to the other about 3 Munsell values.

In FIG. 3 the aircraft is positioned on the hardstand H within the painting matrix M so that the aircraft is pivoted about pivot point P so that the nose is swung to the left of the center line 2 so that the axes of the aircraft 16 forms an angle with the center line 2 of 22½°. It will be noted that a fragment of the wing tip 18 extends outside of border line 4 and outside of the matrix M. In accordance with the invention, all surfaces that lie outside of the matrix M are painted the color value at the line 4 or 2 depending upon which way the aircraft CA is pivoted to the left or right of the center line 2 or a color value greater if dark or lesser if light at the repsective parallel line 2 or 4. It will be further noted that the width of the matrix M is less than the dashed line 14 which is the distance between the trailing edges of the aircraft CA. It will be further obvious that all aircraft of a certain type can be painted on the same matrix by being moved onto the matrix and swung so that the wing tips are within the matrix and touching the border lines 4 and 6. This automatic position on the pivot point P on the center line 2 permits painting according to the percentages indicated by the border lines 4 and 6 as well as the designated intermediate markers 12.

FIG. 4 shows the aircraft pivoted about pivot point 4 so that a portion 18 of the wing tip and a portion 20 of the nose are outside of the matrix M and outside of the border line 4. The axis 16 of the aircraft CA forms an angle of 45° with the center line 2. Any further angulation above an angle of about 45° will render the camouflage scheme generally ineffective as the perception of the aircraft appears more symmetrical. An advantage of this invention is that there is a marked distortion due to "fade out" between different portions of the aircraft along its entire length and width as differing from the "symmetrical" systems.

In FIG. 4, it will be noted that the width of the matrix M is substantially less than the distance between the wing tips as designated by the dash line 14 because of the angulation. It will now be obvious that any matrix can be prepared as desired and that all aircraft of a certain type can be readily positioned in the same matrix and will always assume the same angulation so that a uniform painting scheme can be applied to each aircraft readily and easily.

FIGS. 5 THROUGH 8

Figure 5:
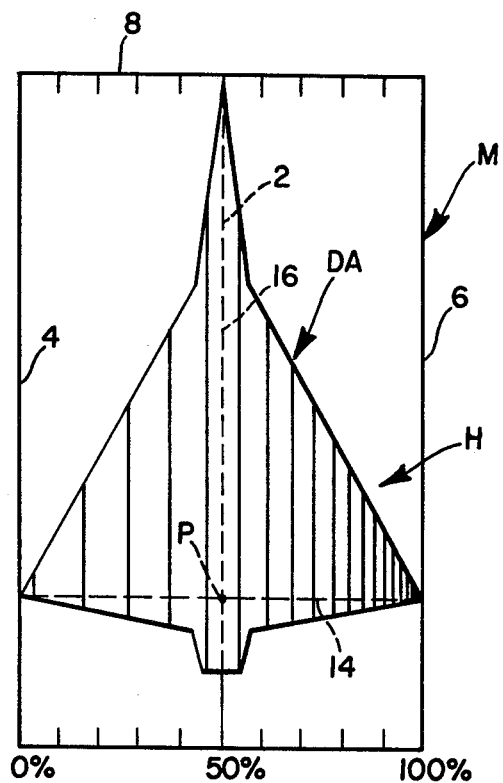
Figure 6:
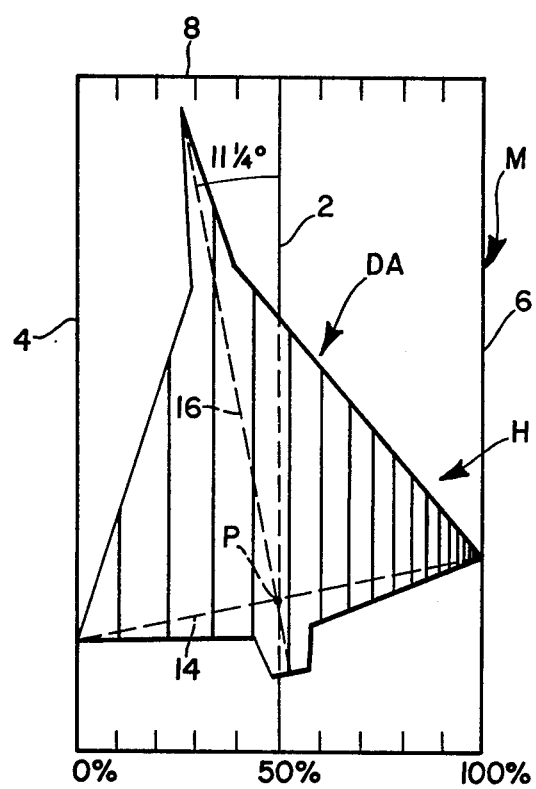
Figure 7:
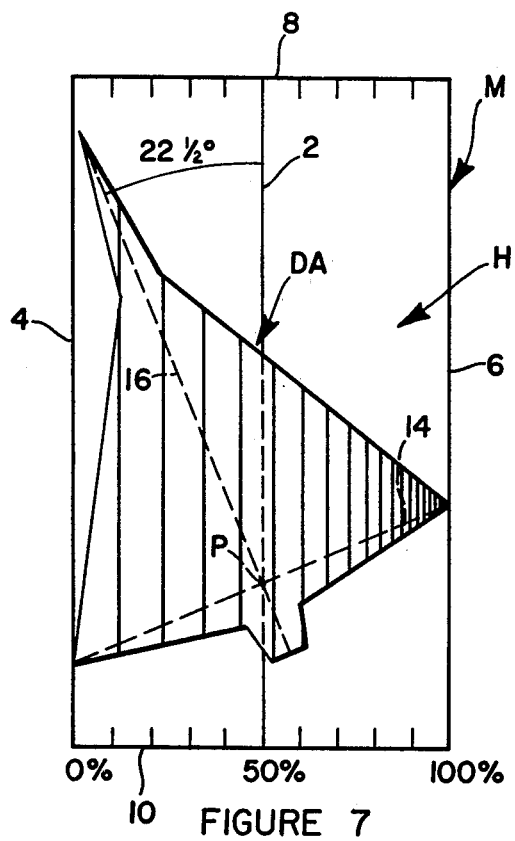
Figure 8:
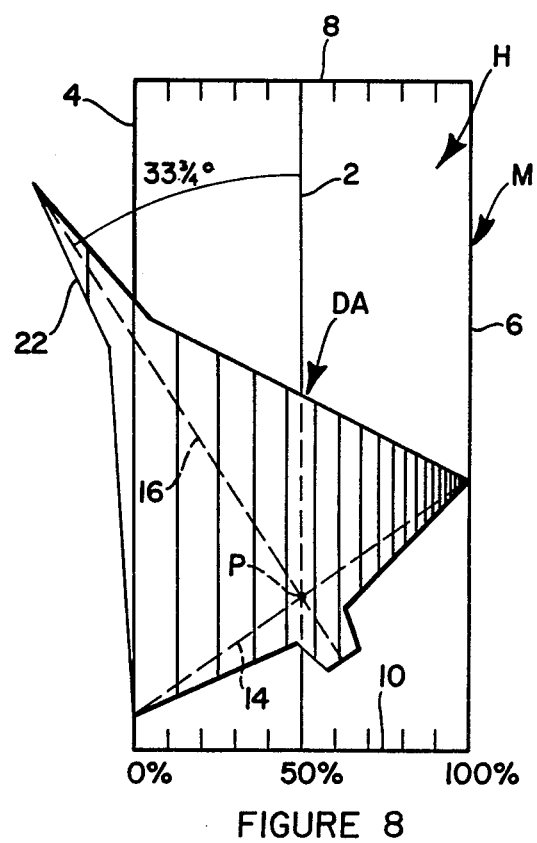

In FIGS. 5 through 8 we observe a delta aircraft DA positioned in the matrix M, of the hardstand H at varying angles from 0° as in FIG. 5, to 11¼° as in FIG. 6, to 22½° as in FIG. 7 and to 33¼ as in FIG. 8. It will be noted that the percentages of coloration are reversed from 0 to 100% and that the lightest color is to the left and the darkest to the right, and as the aircraft is pivoted on point P to the left, the amount of dark Munsell value on the aircraft diminishes as the amount of aircraft swings to the left of the center line 2. It will be noted that the nose portion 22 which lies outside of the border line 4 will remain at the value of the line 4 which is the lightest color on the aircraft. The values between border lines 4 and 6 in FIGS. 5 through 8 as in the case on FIGS. 2 through 4 should be at least about 3 Munsell values in difference from one wing tip to the other as they lie between the border lines 4 and 6. In the instance of the delta aircraft DA. The dashed line 14 is extended between the trailing edges of the wing tips of the aircraft. It should be noted that the scheme of FIGS. 5 through 8 is basically a reversal of that in FIGS. 2 through 4.

FIG. 9

In FIG. 9, the aircraft is shown in layout with the left and right sides of the aircraft shown in elevation along with the top plan. The matrix M on the hardstand H shows a conventional aircraft CA angled about the pivot P. The color scheme is shown running also along the sides of the aircraft. The underside of the aircraft may be painted in the identical scheme or in the reverse sequence such that the under portion of the wing on the dark side might be light and the under portion of the wing on the light side might be dark rather than the under portion of the wing on the dark side being dark and the under portion of the wing on the light side being light as illustrated in FIG. 9. For confusion purposes, it is important that aircraft are not all identical in paint scheme as far as the underside compared with the top side. This will be subsequently explained in detail.

FIG. 10

In FIG. 10, the aircraft paint scheme is not blended but is painted stripes. The portion of the wing 24 which is outside of the border line 4 is the darkest value at line 4. As illustrated, the portion of the aircraft to the left of center line 2 is striped to show half color value changes. The stripe 26 is all of the same Munsell value. Subsequent stripes 28, 30, 32, 34 and 36 are slightly less dark than stripe 26 by one-half Munsell value or greater. This enables us to have a color change in Munsell values of approximately 3 value units. The maximum Munsell value change between 0 and 10 can be made by striping in the same manner. In reference to FIG. 9 it will be noted that a simulated cockpit-canopy 38 is positioned with reference to the real cockpit-canopy 40. In this instance, the simulated cockpit-canopy 38 is light as compared with the dark background painted on the nose portion in the area of the simulated cockpit-canopy 38. Striping or blending may be used depending upon the ease of application. The underside of the aircraft similarly can be striped or blended as desired. The stripes as applied may be blended at the edges or masked as desired.

FIGS. 11 and 12

As shown in FIGS. 11 and 12, the hardstand H will be imprinted or otherwise designated by a matrix M. Means for marking the aircraft could consist of two chalk line poles 42 and 44 mounted on a weighted pedestal 46 and 48 which is provided with rollers or casters. A chalk line 50 extends between the poles 42 and 44 and is movable up and down on the poles. A slot (not shown) on the poles 42 and 44 would permit the chalk line 50 to move vertically and spring means 52 and 54 would maintain a certain degree of tension on the line 50.

In operation, the aircraft CA would be moved into position as previously described and the movable poles 42 and 44 moved relative to the center line 2 and the intermediate markers 12 so that the chalk line would be maintained parallel to the center line 2 and the border lines 4 and 6. Bringing the chalk line down on the aircraft would permit a mark to be imposed thereon so that the painter could apply the different color values to the aircraft beginning dark in one area and ending light in the other area. The aircraft basically has two pairs of coordinate sections with one of the pairs being the forward and aft pair and the other being the left and right coordinate pair. The forward and aft coordinate pair would be the axis 16 whereas the left and right coordinate pair would be the line 14 extending between the tips of the trailing edge of the wings. This is best illustrated in FIGS. 2 through 8.

The line 50 can also be used to cast a straight line shadow across a surface of the aircraft to permit a painter to apply a color value to one side or the other side of the shadow line cast by line 50. Similarly if the line 50 is a chalk line, the chalk may be applied to a part of the surface and extended to cover the entire surface beneath the chalk line by additional chalk lines or by tape or the like. In addition to the chalk line system, a projected light line could be used for painting purposes also. A typical system could be to mount a movable light on the line 50 to cast a light beam line to guide the painter. For blending purposes, an air bruch could be used. If striping is desired as generally disclosed in FIG. 10 standard techniques could be used including masking tape and the like. Instead of one single chalk line for painting purposes, a number of chalk lines could be used so that more than one team could be working simultaneously on a paint scheme. The portability of poles 42 and 44 permits them to be removed from shifted on the end lines 8 and 10 as desired. The under surface of the airplane can be painted in a manner similar to the upper surface by jacking the aircraft up and moving the line 50 beneath the aircraft so that a chalk mark can be made thereon. Similarly, the other various techniques set out above could also be used for painting the scheme on the under surface of the aircraft.

FIGS. 13 THROUGH 16

Figure 13:
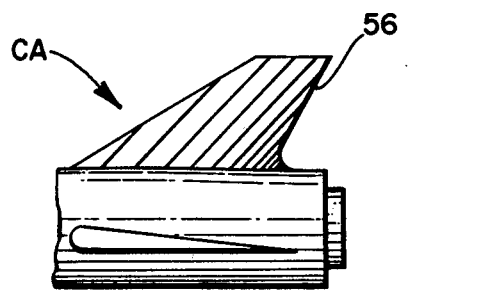
Figure 14:
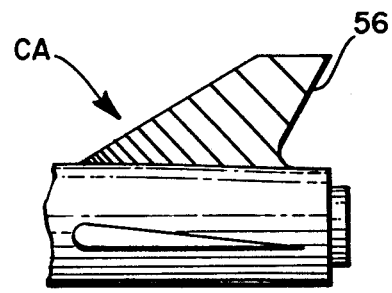

In FIGS. 13 through 16, the vertical stabilizer of the tail 56 of the aircraft CA is shown painted in different schemes. In FIG. 13, the light area is on the forward surface and moves diagonally from top to bottom towards the darkest at the rear of the stabilizes 56. In FIG. 14 the reverse is true in which the darker area is at the forward and the lightest area at the rear of the stabilizer and runs in a diagonal upwardly away from the fuselage of the aircraft.

Figure 15:
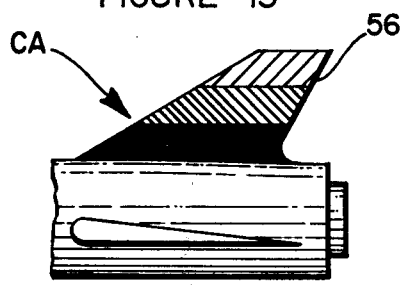
Figure 16:
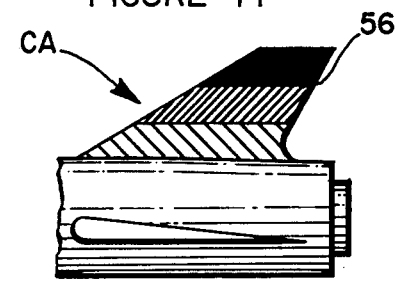

In FIG. 15, the stabilizer 56 is painted in stripes with the darker stripe being closest to the fuselage and parallel to the ground and running vertically towards the lightest color value. The reverse is shown in FIG. 16 in which the darkest color value is at the top of the stabilizer 56 and the lightest color value at the bottom. It is obvious that the striping can also be done in a diagonal fashion as shown in the blending scheme of FIGS. 13 and 14. It is further obvious that the horizontal scheme shown in FIGS. 15 and 16 can be done by the blending operation of FIGS. 13 and 14 without the striping effect. Any variations of the above including alternate angulation or order of Munsell values can be used in painting by striping or blending.

FIG. 17

FIG. 17 shows a series of aircraft 58, 60, 61, 64 and 66. The aircraft are in an assembled formation moving in unison in the same direction. It will be noted that aircrafts 60 and 64 are upside down whereas aircrafts 58, 62 and 66 are in upright position. It will be noted that aircrafts 60 and 64 have painted thereon simulated cockpit-canopies 68 and 70. Aircrafts 58, 52 and 66 also have simulated cockpit-canopies painted thereon, but due to the perspective of the drawings, cannot be seen. It will be noted that the simulated cockpit-canopies 68 and 70 correspond in position to the read cockpit-canopies 72, 74 and 76. In general it is desirous that the simulated cockpit-canopies have the same general outline as the real cockpit-canopies and can include any cross bars or the like in order to be realistic. It is desirable that they be positioned on the aircraft directly beneath the real cockpit-canopy and have a length and width substantially equivalent thereto.

It will be further noted that the aircraft are painted so that they are not all of the same paint scheme running from left to right. In FIG. 17, the upper surface of the upright aircraft 58 and 62 are painted in the same paint scheme except with regard to the vertical stabilizer. Upright aircraft 66 it will be noted has a reverse paint scheme on the upper surface and its stabilizer is painted similar to the stabilizer of aircraft 58 but reverse of aircraft 62. It will also be further noted that aircraft 60 and 64 have reverse paint schemes thereon as far as the bottom surface of the aircraft and the vertical stabilizers are concerned. It will be noted that the paint schemes on the bottom of aircrafts 60 and 64 are reverse of each other including the tail vertical stabilizers. The under surface of aircraft 60 resembles the upper paint scheme on aircrafts 58 and 62 with the exception that the vertical stabilizer of aircraft 60 is similar to the vertical stabilizer of aircraft 58 but the reverse of aircraft 62. Similarly, the under surface of aircraft 64 resembles the upper surface of aircraft 66 with the exception that the vertical stabilizer of aircraft 64 differs completely from any of the other aircrafts in the formation.

It will now be obvious in looking at FIG. 17, that a number of aircraft flying in formation whether two or more, would add to the confusion when a pilot of an enemy aircraft observes the aircraft in formation. He will be confused particularly if the aircraft roll through 180° or more. He will not be immediately able to determine whether the aircraft are upside down or rightside up whether they are coming toward him or going away. Furthermore, he will be unable to determine a set pattern or maneuver for any number of aircraft since the aircraft can shift position in formation which would make it extremely difficult for him to judge which aircraft are upright and are upside down at any one time. Any change in formation or any change in attitude of an aircraft within a maneuver will produce a visual effect on an observer which will cause him delays or errors in making a determination as to whether the aircraft are actually moving into a position of attack or away. Furthermore, the paint scheme on the aircraft tends to cause portions of the aircraft to fade out adding considerably to the difficulty in identifying the type of aircraft being observed. With the particular paint scheme employed, the light areas or dark areas will dissolve in the distance depending upon the background. This will give a distorted effect particularly as the aircraft will be painted on the diagonal creating the distortion as heretofore mentioned. It will also be noted that the simulated cockpit-canopy painted on the aircraft where the nose portion is dark will itself be light as illustrated in FIG. 17. If the nose portion is painted light in the manner of FIGS. 5 through 8, then the cockpit-canopy itself will be painted dark in order to stand out against the light surface.

It now becomes obvious that any pilot in a formation can so maneuver his aircraft as to roll it through 180° or more and restablize it in formation either in the upside down or the upright position and an observer will be unable to immediately discern what happened during the maneuver. In such a position, the aircraft observed may be in a position to immediately pull away from the observer or more in on the observer while he is attempting to determine exactly what happened during the maneuver.

With reference to the method of painting previously discussed, it may be stated in general that the distance between the outer lines of the grid are not less than about two-thirds the distance between the tips of the traling edge of the wings. By applying this general rule of thumb, the angular paint scheme on the aircraft will proximate the 45° angulation as generally shown in FIG. 4 which is about the maximum degree to have an effective paint scheme as previously discussed.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What I claim is:

1. A camouflaged and deceptive distorted vehicle comprising:
   (a) a top and bottom surface,
   (b) said surfaces having two pairs of coordinate sections including a first fore and aft coordinate sections pair extending from adjacent the front edge of said vehicle to adjacent the rear edge of said vehicle and a second left and right coordinate sections, pair, extending from adjacent the one side edge of said vehicle to adjacent the opposite side edge of said vehicle,
   (c) at least one of said two pairs of coordinate sections of said top surface being colored, and
   (d) said color on said at least one of said two pairs of coordinate sections at said top surface graduating from dark to light beginning dark adjacent one edge on one section and ending light on the other adjacent edge of said one section.

2. A camouflaged vehicle as in claim 1 and wherein:
   (a) said at least one graduating colored pair of said top surface is said first fore and aft coordinate sections pair.

3. A camouflaged vehicle as in claim 1 and wherein:
   (a) said at least one graduating colored pair of said top surface is said second left and right coordinate sections pair.

4. A camouflaged vehicle as in claim 2 and wherein:
   (a) said graduating color of said top surface begins dark on said fore coordinate section and ends light on said aft coordinate section.

5. A camouflaged vehicle as in claim 2 and wherein:
   (a) said graduating color of said top surface begins dark on said aft coordinate section and ends light on said fore coordinate section.

6. A camouflaged vehicle as in claim 3 and wherein:
   (a) said graduating color of said top surface begins dark on said left coordinate section and ends light on said right coordinate section.

7. A camouflage vehicle as in claim 3 and wherein:
   (a) said graduating color of said top surface begins dark on said right coordinate section and ends light on said left coordinate section.

8. A camouflage vehicle as in claim 1 and wherein:
   (a) said other of said two pairs of coordinate sections of said top surface is colored and said color on said other of said two pairs of coordinate sections of said top surface graduates from dark to light beginning dark on one section of said other coordinate pair and ending light on the other section of said other coordinate pair.

9. A camouflaged vehicle as in claim 1 and wherein:
   (a) at least one of said two pairs of coordinate sections of said bottom surface is colored, and
   (b) said color on said at least one of said two pairs of coordinate sections of said bottom surface graduates from dark to light beginning dark on one section and ending light on the other section.

10. A camouflaged vehicle as in claim 9 and wherein:
    (a) at least one graduating colored pair of said bottom surface is said first fore and aft coordinate sections pair.

11. A camouflaged vehicle as in claim 9 and wherein:
    (a) said at least one graduating colored pair of said bottom surface is said second left and right coordinate sections pair.

12. A camouflaged vehicle as in claim 10 and wherein:
    (a) said graduating colored pair of said bottom surface begins dark on said fore coodinate section and ends light on said aft coordinate section.

13. A camouflaged vehicle as in claim 11 and wherein:
    (a) said graduating colored pair of said bottom surface begins dark on said left coordinate section and ends light on said right coordinate section.

14. A camouflaged vehicle as in claim 10 and wherein:
    (a) said graduating colored pair of said bottom surface begins dark on said aft coordinate section and ends light on said fore coordinate section.

15. A camouflaged vehicle as in claim 11 and wherein:
    (a) said graduating colored pair of said bottom surface begins dark on said right coordinate section and ends light on said left coordinate coordinate section.

16. A camouflaged vehicle as in claim 1 and wherein:
    (a) said color of said top surface is graduated from dark to light by continuous blending.

17. A camouflaged vehicle as in claim 9 and wherein:
    (a) said color of said bottom surface is graduated from dark to light by continuous blending.

18. A camouflaged vehicle as in claim 1 and wherein:
    (a) said color of said top surface is graduated from dark to light by striping.

19. A camouflaged vehicle as in claim 9 and wherein:
    (a) said color of said bottom surface is graduated from dark to light by striping.

20. A camouflaged vehicle as in claim 1 and wherein:
    (a) said color on a Munsell Value Scale of 0 to 10 ranges at a minimum of about 3 consecutive Munsell Values on said top surface.

21. A camouflaged vehicle as in claim 9 and wherein:
    (a) said color on a Munsell Value Scale of 0 to 10 ranges at a minimum of about 3 consecutive Munsell Values on said bottom surface.

22. A camouflaged vehicle as in claim 20 and wherein:
    (a) said color on said Munsell Value Scale of 0 to 10 ranges at a minimum of about 3 consecutive Munsell Values on said bottom surface.

23. A camouflaged vehicle as in claim 1 and wherein:
    (a) said graduating color on said top surface reaches approximately 50% color change between said fore and aft coordinate sections at approximately midway between said fore and aft top coordinate sections.

24. A camouflaged vehicle as in claim 9 and wherein:
    (a) said graduating color on said bottom surface reaches approximately 50% color change between said fore and aft coordinate sections at approximately midway between said fore and aft bottom coordinate sections.

25. A camouflaged vehicle as in claim 1 and wherein:
    (a) said graduating color on said top surface reaches approximately 50% color change between said left and right top coordinate sections at approximately midway between said left and right top coordinate sections.

26. A camouflaged vehicle as in claim 9 and wherein:
(a) said graduating color on said bottom surface reaches approximately 50% color change between said left and right bottom coordinate sections at approximately midway between said left and right coordinate sections.

27. A camouflaged vehicle as in claim 9 and wherein:
(a) said top and bottom surfaces are substantially identical to each other in color pattern.

28. A camouflaged vehicle as in claim 27 and wherein:
(a) said top and bottom surface colored patterns are substantially identical to each other and are in aligned axial matching relationship when viewed from the same direction.

29. A camouflaged vehicle as in claim 1 and wherein:
(a) said color on said top surface graduates from dark to light at an angle to the longitudinal axis of said vehicle.

30. A camouflaged vehicle as in claim 9 and wherein:
(a) said color graduates on said top and bottom surfaces from dark to light at an angle to the longitudinal axis of said vehicle.

31. A camouflaged vehicle as in claim 20 and wherein:
(a) said color on said top surface graduates from dark to light at an angle to the longitudinal axis of said vehicle.

32. A camouflaged vehicle as in claim 21 and wherein:
(a) said color on said bottom surface graduates from dark to light at an angle to the longitudinal axis of said vehicle.

33. A camouflaged vehicle as in claim 22 and wherein:
(a) said color on said top and bottom surfaces graduates from dark to light at an angle to the longitudinal axis of said vehicle.

34. A camouflaged vehicle as in claim 1 and wherein:
(a) said color on said top surface graduates from dark to light from an angle of 0° to about 45° to the longitudinal axis of said vehicle.

35. A camouflaged vehicle as in claim 9 and wherein:
(a) said color on said bottom surface graduates from dark to light from an angle of 0° to about 45° to the longitudinal axis of said vehicle.

36. A camouflaged vehicle as in claim 9 and wherein:
(a) said color on said top and bottom surfaces graduates from dark to light from an angle of 0° to about 45° to the longitudinal axis of said vehicle.

37. A camouflaged vehicle as in claim 34 and wherein:
(a) said angle is measured from the forward facing longitudinal axis.

38. A camouflaged vehicle as in claim 35 and wherein:
(a) said angle is measured from the forward facing longitudinal axis.

39. A camouflaged vehicle as in claim 36 and wherein:
(a) said angle is measured from the forward facing longitudinal axis.

40. A camouflaged vehicle as in claim 1 and wherein:
(a) said beginning dark on one section of said top surface includes a uniformally colored dark portion.

41. A camouflaged vehicle as in claim 40 and wherein:
(a) said vehicle includes a nose and wing and
(b) said uniformally colored dark portion is a portion of said nose.

42. A camouflaged vehicle as in claim 40 and wherein:
(a) said vehicle includes a nose and a wing, and
(b) said uniformally colored dark portion is a portion of said wing.

43. A camouflaged vehicle as in claim 9 and wherein:
(a) said beginning dark on one section of said bottom includes a uniformally colored dark portion.

44. A camouflaged vehicle as in claim 43 and wherein:
(a) said vehicle includes a nose and wing, and
(b) said uniformally colored dark on one section of said top and bottom includes a portion of said nose.

45. A camouflaged vehicle as in claim 43 and wherein:
(a) said vehicle includes a nose and wing, and
(b) said uniformally colored dark portion includes a portion of said wing and nose.

46. A camouflaged and deceptive distorted vehicle comprising:
(a) a top and bottom surface,
(b) said surfaces having two pairs of coordinate sections including a first fore and aft coordinate sections pair and a second left and right coordinate sections pair,
(c) at least one of said two pairs of coordinate sections of said top surface being colored,
(d) said color on said at least one of said two pairs of coordinate sections of said top surface graduating from dark to light beginning dark on one section and ending light on the other section,
(e) at least one of said two pairs of said coordinate sections of said bottom surface being colored,
(f) said color on said at least one of said two pairs of coordinate sections of said bottom surface graduating from dark to light beginning dark on one section and ending light on the other section, and
(g) said top and bottom surfaces being substantially identical to each other in color pattern.

47. A camouflaged and deceptive distorted vehicle comprising:
(a) a top and bottom surface,
(b) said surfaces having two pairs of coordinate sections including a first fore and aft coordinate sections pair and a second left and right coordinate sections pair,
(c) at least one of said two pairs of coordinates sections of said top surface being colored,
(d) said color on said at least one of said two pairs of coordinate sections of said top surface graduating from dark to light beginning dark on one section and ending light on the other section,
(e) at least one of said two pairs of coordinate sections of said bottom surface being colored,
(f) said color on said at least one of said two pairs of coordinate sections of said bottom surface graduating from dark to light beginning dark on one section and ending light on the other section, (g) said color on said top and bottom surface surfaces graduating from dark to light from an angle of 0° to about 45° to the longitudinal axis of said vehicle, (h) said angle being measured from the forward facing longitudinal axis, (i) said top surface including a real cockpit-canopy, (j) said bottom surface including a simulated cockpit-canopy in the same general area longitudinally of said fuselage as said real cockpit-canopy so that, (k) only one of said canopies is visible when said vehicle is perceived from directly above said top surface of directly below said bottom surface.

48. A camouflaged vehicle as in claim 47 and wherein:

(a) said simulated cockpit-canopy is light against said dark graduating color.

49. A method of camouflaging aircraft including the steps of:

(a) determining the longitudinal axis of said vehicle and determining on said axis on said aircraft a pivot point midway between an imaginary line drawn from the tip of one trailing edge of one wing surface to the opposite tip of the trailing edge of said opposite wing surface, (b) marking off a first ground line and placing said aircraft on said first marked off ground line so that said longitudinal axis and said marked off ground line are spaced one above the other, (c) swinging said aircraft about said point as a pivot while holding said pivot point directly above said marked off ground line and swinging through an arc of up to about 45° from the forward direction of said aircraft when on said marked off ground line, (d) marking off a pair of parallel ground lines parallel to said first marked off ground line with one of said marked off parallel ground lines passing through an imaginary point determined by the normal passing through the tip of the trailing edge of one wing and the ground and the other of said marked off parallel ground lines passing through an imaginary point determined by the normal passing through the tip of the trailing edge of the other wing and the ground, and (e) marking off between said first marked off ground line and said marked off parallel ground lines a series of second parallel lines extending fore and aft of said aircraft indicating the percent of change from a dark color Munsell Value to a light color Munsell Value with one marked off parallel ground line indicating 100% of the darkest Munsell Color Value to be applied and the other marked off parallel ground line indicating 100% of the lightest Munsell Color Value to be applied with the first marked off ground line indicating a color variation of 50% between the maximum dark and maximum light Munsell Color Values to be applied to said aircraft, (f) applying paint to said aircraft by graduating according to the marked off ground lines and the percent between 100 as the darkest Munsell Color Value and 0 as the lightest Munsell Color Value with minimum values between dark and light of about 3 consecutive Munsell Values.

50. The method of camouflaging as in claim 49 and including the steps of:

(a) applying said paint by blending gradually from one Munsell Color Value to the next Munsell Color Value according to the marked off ground lines.

51. The method of camouflaging as in claim 49 and including the step of:

(a) applying said paint by graduated striping from one Munsell Color Value to the next succeeding Munsell Color Value according to the marked off ground lines.

52. The method of camouflaging as in claim 49 and including the step of:

(a) duplicating said marked off ground lines by positioning a series of chalk lines above said ground lines parallel therewith and chalk marking said aircraft with said chalk lines to indicate the most important areas where changes in color value should take place on the aircraft during painting, and (b) painting according to said applied chalk marks.

53. The method of camouflaging as in claim 49 and including the step of:

(a) applying to said aircraft at various intervals marker type corresponding to said marked off parallel ground lines (b) and painting said aircraft according to said applied marker tape.

54. The method of camouflaging an aircraft including the steps of:

(a) forming a grid on the ground of parallel lines of a width not exceeding the distance between the tip of the trailing edge of one wing to the tip of the trailing edge of the other wing, (b) placing said aircraft in said grid so that trailing wing tips of said wing lie on the outer lines of said grid, (c) marking said aircraft with grid lines corresponding to said ground grid lines and (d) painting said aircraft graduating from dark to light from the outermost line of one side of said grid to the outermost line of the other side of said grid.

55. The method of claim 49 and including the step of:

(a) painting those portions of said aircraft outside of said ground lines the darkest or lightest color value according to the color value of the last marked off ground line adjacent thereto.

56. The method of claim 54 and including the step of:

(a) painting those portions of said aircraft outside of said grid the darkest or lightest color value according to the color value of the last marked off grid line adjacent thereto.

57. The method of claim 54 and including the step of:

(a) applying said paint to said aircraft by blending gradually from one Munsell Color Value to the next succeeding Munsell Color Value according to the marked off grid lines.

58. The method of claim 54 and including the step of:

(a) applying said paint to said aircraft by graduated striping from one Munsell Color Value to the next suceeding Munsell Color Value according to the marked off grid lines.

59. The method of claim 54 and including the step of:

(a) forming said grid with distance between the outer lines of said grid being not less than about 2/3 the distance between the tip of the trailing edge of one wing to the tip of the trailing edge of the other wing.

60. The method of camouflaging and deceptively distorting a plurality of aircraft in assembled cooperative relation which includes the steps of:

(a) painting a plurality of aircraft with a substantially similar pattern design on top and bottom surfaces, and
(b) painting at least one aircraft of said plurality with said similar pattern reversed with respect to at least one of said top and bottom surfaces from at least one of said other aircraft of said plurality of aircraft
(c) whereby when said at least one aircraft is rolled 180° with respect to said at least one of said other aircraft, an observer becomes confused for a period of time trying to decide whether he is observing the top or bottom of the rolled aircraft.

61. The method of camouflaging as in claim 60 and including the step of:
(a) reversing the similar pattern of said top surface of said at least one aircraft from at least one of said other aircraft of said plurality of aircraft.

62. The method of camouflaging as in claim 60 and including the step of:
(a) reversing the similar pattern of said bottom surface of said at least one aircraft from at least one of said other aircraft of said plurality of aircraft.

63. The method of camouflaging as in claim 60 and including the step of:
(a) reversing the similar pattern of said top and bottom surfaces of said at least one aircraft from at least one of said other aircraft of said plurality of aircraft.

64. An assembly of aircraft including:
(a) a first aircraft in said assembly having a camouflaged deceptively distorted pattern on said top and bottom surfaces,
(b) a second aircraft in said assembly having a camouflaged deceptively distorted pattern similar to said first aircraft, and
(c) at least one of said top and bottom surfaces of said second aircraft having its pattern reversed from said first aircraft in said assembly,
(d) whereby when said second aircraft of said assembly is rolled 180° with respect to said first aircraft of said assembly an observer becomes confused for a period of time trying to decide whether he is observing the top or bottom of the rolled aircraft.

65. An assembly as in claim 64 and wherein:
(a) said top surface of said second aircraft is reversed from said first aircraft in said assembly.

66. An assembly as in claim 64 and wherein:
(a) said bottom surface of said second aircraft is reversed from said first aircraft in said assembly.

67. An assembly as in claim 64 and wherein:
(a) said top and bottom surfaces of said second aircraft are reversed from said first aircraft in said assembly.

68. A camouflaged and deceptive distorted vehicle as in claim 1 and including:
(a) a vertical stabilizer and
(b) said vertical stabilizer having a dark to light scheme painted thereon.

69. A camouflaged and deceptive distorted vehicle as in claim 68 and wherein:
(a) said stabilizer paint scheme is blended.

70. A camouflaged and deceptive distorted vehicle as in claim 68 and wherein:
(a) said stabilizer paint scheme is striped.

* * * * *